United States Patent
Harpur et al.

(10) Patent No.: US 10,282,599 B2
(45) Date of Patent: May 7, 2019

(54) VIDEO SENTIMENT ANALYSIS TOOL FOR VIDEO MESSAGING

(71) Applicant: International Business Machines Corporation, Armonk, NY (US)

(72) Inventors: Liam Harpur, Dublin (IE); Erik H. Katzen, Argyle, TX (US); Sumit Patel, Irving, TX (US); John Rice, Waterford (IE)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 15/215,557

(22) Filed: Jul. 20, 2016

(65) Prior Publication Data

US 2018/0025221 A1    Jan. 25, 2018

(51) Int. Cl.
| | |
|---|---|
| G06K 9/00 | (2006.01) |
| G06K 9/72 | (2006.01) |
| G10L 25/00 | (2013.01) |
| H04L 12/58 | (2006.01) |
| H04N 21/442 | (2011.01) |

(52) U.S. Cl.
CPC ......... *G06K 9/00315* (2013.01); *G06K 9/723* (2013.01); *H04L 51/10* (2013.01); *H04L 51/32* (2013.01); *H04N 21/44218* (2013.01); *G06K 2009/00328* (2013.01); *G10L 25/00* (2013.01)

(58) Field of Classification Search
CPC ..... G06K 9/00315; G06K 2009/00328; G06K 9/723; G10L 25/63; G10L 13/027; G10L 21/00; G10L 25/00; G06F 17/2765; H04L 51/10; H04N 7/14
See application file for complete search history.

(56) References Cited

U.S. PATENT DOCUMENTS

| | | | |
|---|---|---|---|
| 9,336,268 B1 * | 5/2016 | Moudy | G06F 17/30412 |
| 2008/0037841 A1 * | 2/2008 | Ogawa | H04N 5/232 |
| | | | 382/118 |
| 2014/0091897 A1 * | 4/2014 | Lemmey | A61B 5/165 |
| | | | 340/3.1 |
| 2015/0189085 A1 | 7/2015 | Riahi et al. | |
| 2015/0324352 A1 | 11/2015 | Meyer et al. | |
| 2015/0347903 A1 | 12/2015 | Saxena et al. | |
| 2015/0379989 A1 * | 12/2015 | Balasubramanian | |
| | | | G06Q 30/0255 |
| | | | 704/233 |
| 2015/0381939 A1 | 12/2015 | Cunico et al. | |
| 2016/0037127 A1 | 2/2016 | Cunico et al. | |
| 2016/0042281 A1 | 2/2016 | Cunico et al. | |

* cited by examiner

Primary Examiner — Menatoallah Youssef
(74) Attorney, Agent, or Firm — Steven M. Greenberg, Esq.; Shutts & Bowen LLP

(57) ABSTRACT

Embodiments of the invention provide a method, system and computer program product for video sentiment analysis in video messaging. In an embodiment of the invention, a method for video sentiment analysis in video messaging includes receiving different video contributions to a thread in a social system executing in memory of a computer and sensing from a plurality of the video contributions a contributor sentiment. Thereafter, a sentiment value for the different video contributions is computed and a sentiment value for a selected one of the video contributions is displayed in a user interface to the thread for an end user contributing a new video contribution to the thread.

18 Claims, 2 Drawing Sheets

VIDEO SENTIMENT ANALYSIS TOOL FOR VIDEO MESSAGING

BACKGROUND OF THE INVENTION

Field of the Invention

The present invention relates to video messaging and more particularly to video message analysis.

Description of the Related Art

Social video represents the logical result of high speed Internet access coupled with mobile anywhere anytime computing and social media. No longer relegated to mere textual contributions to an online conversation due to technological limitations, social media participants now may provide video commentary as part of the online conversation. Indeed, the context of the content of a message oftentimes changes the content of the message itself and, while not readily ascertainable through textual content, is easily interpretable through video content—especially the tone of voice of the contributor and the facial expression of the contributor.

As in the case of traditional social media, the threaded posting of video contributions may vary from a mere handful of postings to many dozens of postings of video and beyond. For smaller threads, viewing each posted video in a threaded video discussion prior to an end user submitting a video contribution requires little time.

BRIEF SUMMARY OF THE INVENTION

Embodiments of the present invention address recognize that for larger threads, in many instances end users neglect to view older video postings—especially those with access that has been visually obscured by the host site. Consequently, the context of prior video postings may be lost upon a new contributor who has neglected to review all prior video postings. In this regard, providing a contribution to a thread of discussion with a tone that runs counter to the tone of prior contributions to the thread of discussion is awkward and can create interpersonal conflicts in the worst instance. Therefore, knowing the context of the prior commentary of other contributors in a thread of discussion is an important factor in the tone of a new comment posted by a new contributor. To the extent that a contributor is unaware of the tone of prior video contributions, then, the contributor runs a risk of posting a video contribution out of context.

Therefore, embodiments of the present invention provide a novel and non-obvious method, system and computer program product for video sentiment analysis in video messaging. In an embodiment of the invention, a method for video sentiment analysis in video messaging includes receiving different video contributions to a thread in a social system executing in memory of a computer and sensing from a plurality of the video contributions a contributor sentiment. Thereafter, a sentiment value for the different video contributions is computed. Finally, a sentiment value for a selected one of the video contributions is displayed in a user interface to the thread for an end user contributing a new video contribution to the thread. Optionally, an aggregate sentiment for all of the video contributions is displayed in the user interface to the thread.

In one aspect of the embodiment, the sensing is facial recognition in order to determine an emotion of a contributor of a corresponding one of the video contributions. In another aspect of the embodiment, the sensing is a sound analysis in order to determine a tone of a contributor of a corresponding one of the video contributions. In yet another aspect of the embodiment, the sensing is a textual parsing of content of each of the video contributions in order to determine a level of jargon of a corresponding one of the video contributions. In even yet another aspect of the embodiment, the sensing is each of facial recognition, a sound analysis and a textual parsing of content of each of the video contributions such that the computed sentiment for the selected one of the video contributions is a combination of a numerical value computed for a sensed emotion for the selected one of the video contributions, a numerical value computed for a level of jargon for the selected one of the video contributions and a numerical value computed for a level of sarcasm for the selected one of the video contributions.

Notably, a reply video contribution to the thread may be received from a contributor. If so, a contributor sentiment is sensed from the reply video contribution. Thereafter, a sentiment value is computed for the reply video contribution. Finally, the contributor is prompted to provide a different video contributor responsive to a determination of a threshold inconsistency between the sentiment value computed for the reply video contribution and the sentiment value computed for the different, existing video contributions.

In another embodiment of the invention, a data processing system is configured for video sentiment analysis in video messaging. The system includes a computer with memory and at least one processor and a social system executing in the memory of the computer. As well, a video sentiment analysis module is provided and includes program code executing in the memory of the computer. The program code senses a contributor sentiment from each of several different video contributions to a thread in the social system, computes a sentiment for each of the different video contributions, and displays a sentiment for a selected one of the different video contributions in a user interface to the thread for an end user contributing a new video contribution to the thread.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for video sentiment analysis in video messaging. In accordance with an embodiment of the invention, different video contributions are received in a thread in a social system. A sentiment for each video contribution is determined therefrom, for instance by way of facial recognition, sound analysis and video content analysis. Thereafter, a sentiment for one or more of the video contributions is computed and presented in a user interface in connection with a new video contribution to the thread. In this way, an end user providing the new video contribution can enjoy an awareness as to the context and prior tone of past video contributions to the thread. As well, the new video provided by the end user may be analyzed and modified to ensure that the sentiment computed for the new video is reasonably correlated to that of the one or more video contributions of the thread.

Figure 1:
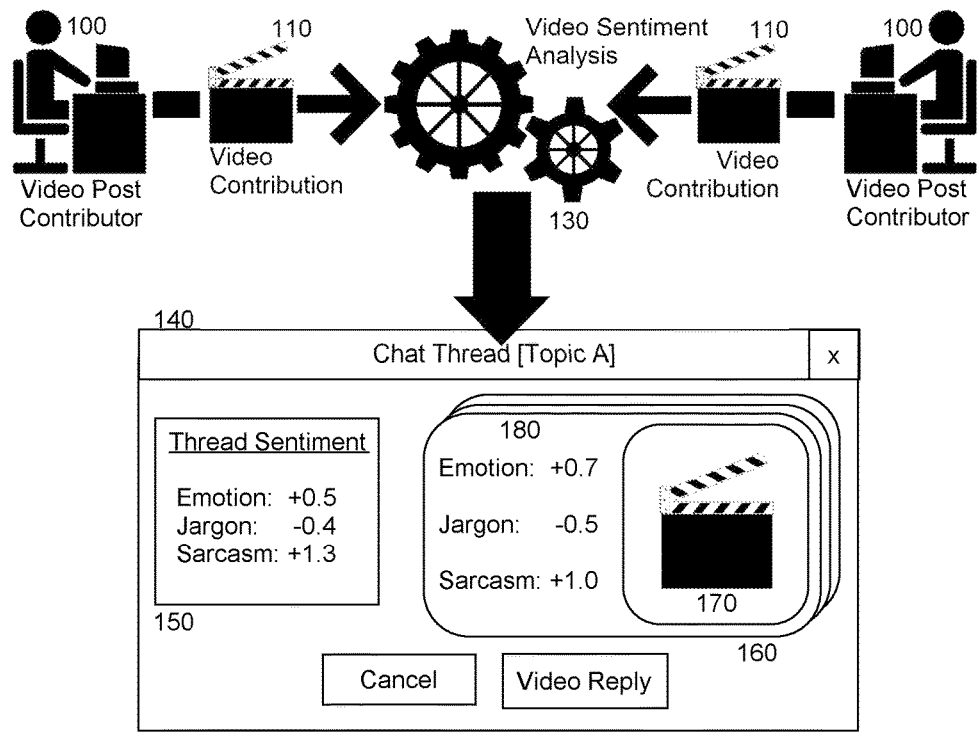
FIG. 1 is a pictorial illustration of a process for video sentiment analysis in video messaging.

In further illustration, FIG. 1 pictorially shows a process for video sentiment analysis in video messaging. As shown in FIG. 1, different video post contributors 100 upload video contributions 110 to a thread 140 of related ones of the video contributions 110 pertaining to a particular topic within a social media system. Each of the video contributions 110 may be accessed by an end user within a listing 160 of the video contributions 110, each entry in the listing 160 providing a video playback view 170 of a corresponding one of the video contributions 110 as well as a user interface control response to which a new one of the video contributions 110 may be uploaded as a reply. Of note, video sentiment analysis 130 analyzes each corresponding one of the video contributions 110 in order to determine a sentiment therefor.

In this regard, the video sentiment analysis 130 employs facial recognition to a face visible in a corresponding one of the video contribution 110 in order to detect an emotion for the corresponding one of the video contributions 110. Video sentiment analysis 130 also employs sound analysis detection to detect a tone of voice audible in the corresponding one of the video contributions 110 in order to detect a tone of the corresponding one of the video contributions 110. Finally, video sentiment analysis 130 employs video content analysis in order to detect a degree of jargon—special words or expressions that are used by a particular profession or group and are difficult for others to understand—in the corresponding one of the video contributions 110. Video sentiment analysis 130 then provides a value for each for presentation in connection with the playback view 170 of the corresponding one of the video contributions 110. Optionally, a combination of the different values for each of detected emotion, tone and degree of jargon is presented in an aggregate display of thread sentiment 150 in connection with the playback view 170 of the corresponding one of the video contributions 110.

Figure 2:
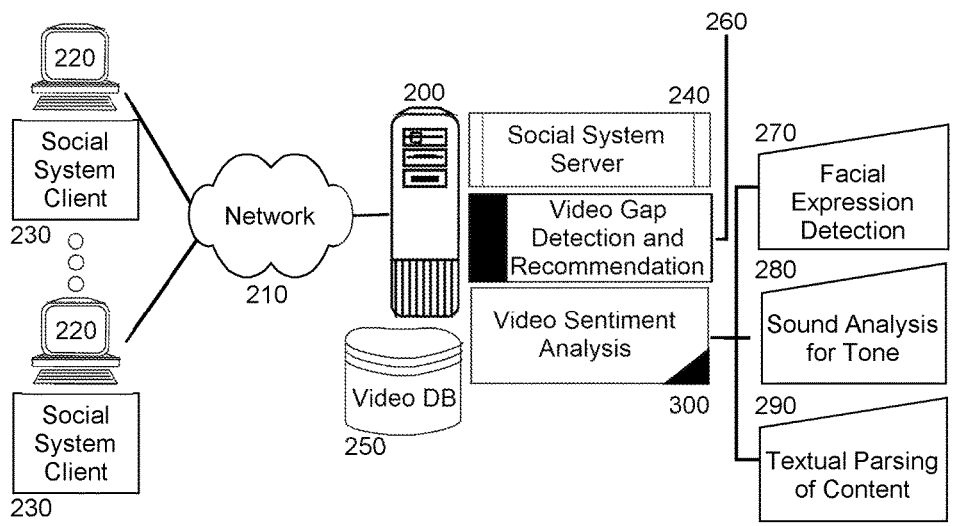
FIG. 2 is a schematic illustration of a data processing system configured for video sentiment analysis in video messaging; and, FIG. 3 is a flow chart illustrating a process for video sentiment analysis in video messaging.

The process described in connection with FIG. 1 may be implemented in a data processing system supporting a social system supporting video contributions to a threaded discussion such as a group chat or community forum. In yet further illustration, FIG. 2 schematically shows a data processing system configured for video sentiment analysis in video messaging. The system includes a host computing platform 200 having one or more computers, each with memory and at least one processor. The host computing platform 200 is communicatively coupled over computer communications network 210 to different social system clients 230 in respectively different client computers 220. The host computing platform 200 supports the operation of a social system server 240 providing social networking services to the different social system clients 230 including group chats or conversations organized into different threads of discussion for different topics, and especially supporting video contributions to the different threads of discussion. To that end, the social system server 240 accepts the uploading of different video contributions into a video database 250 by the different social system clients 230.

Of import, video sentiment analysis module 300 is coupled to the social system server 240. The video sentiment analysis module 300 includes program code that when executing in the memory of the host computing platform 200, responds to the uploading of a video contribution by processing the video contribution in order to determine a sentiment of the video contribution. In particular, the video sentiment analysis module 300 accesses a facial expression detection code portion 270 to analyze imagery of a face in the video contribution in order to determine an emotion expressed by the face during the video contribution. Video sentiment analysis module 300 also accesses a sound analysis portion 280 to analyze audio of the video contribution in order to determine a tone of the video contribution. Finally, the video sentiment analysis module 300 accesses a content analysis portion 290 to speech recognize the audio of the video contribution, to parse the speech recognized audio and to determine a level of jargon present in the parsed speech recognized audio.

Optionally, the video sentiment analysis module 300 assigns a value to each of the determined emotion, tone and jargon level for each video contribution in the video database 250. The value, for example, may range from −1.0 to +1.0 indicating a range of negative to positive emotion, tone and jargon level. In the alternative, the video sentiment analysis module 300 may assign a textual indication of the determined emotion, tone and level of jargon in combination with a degree of intensity of the emotion, tone and jargon level, such as "very angry", "moderately sarcastic" and "low jargon usage". In any event, once the video sentiment analysis module 300 has determined the emotion, tone and degree of jargon usage in a video contribution, the video sentiment analysis module 300 displays as a video sentiment of the corresponding video contribution, the determined emotion, tone and degree of jargon, all for viewing by subsequent participants to the associated thread of discussion.

A video gap detection and recommendation module 260 also can be coupled to the social system server 240. The video gap detection and recommendation module 260 includes program code enabled upon execution in the memory of the host computing platform 200 to respond to a newly uploaded video contribution to the social system server 240 by comparing the video sentiment computed by the video sentiment analysis module 300 for the newly uploaded video contribution to either a video sentiment previously computed by the video sentiment analysis module 300 for a related video contribution in the same thread of discussion, or an aggregate sentiment computed by the video sentiment analysis module 300 for all of the previously uploaded video contributions of the same thread of discussion. Upon detecting a threshold disparity between the video sentiment of the newly uploaded video contribution and either the previously computed sentiment or the aggregate sentiment, the video gap detection and recommendation module 260 directs a display of a prompt in the social system server 240 to upload a different video contribution more consistent with the previously computed sentiment or the aggregate sentiment with suggestions as to how to reduce the threshold disparity. For instance, the video gap detection and recommendation module 360 may include a breakdown of the sentiment of the existing video contributions such as the determined emotion, tone and degree of jargon for entirety of the thread.

Figure 3:
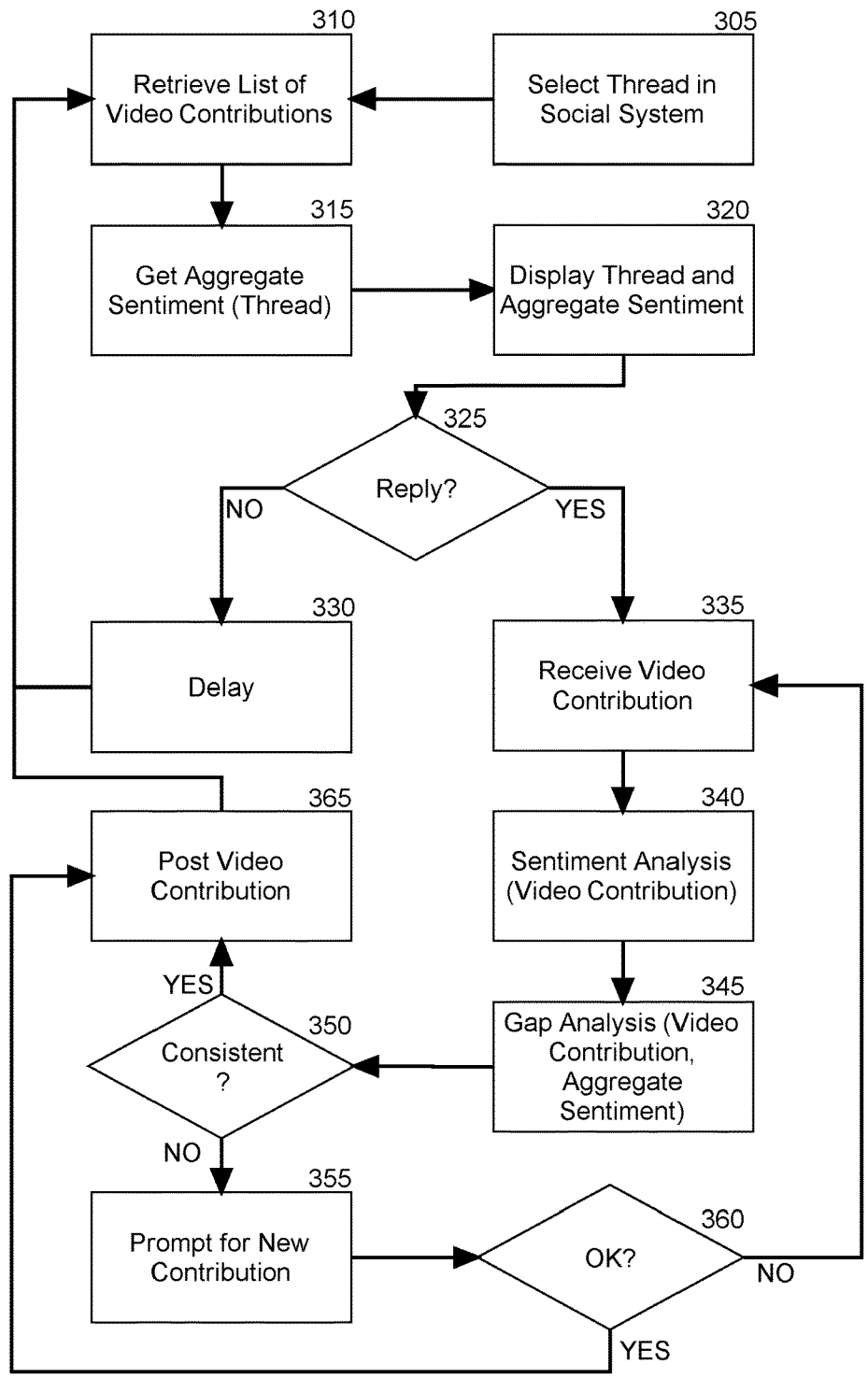

In even yet further illustration of the operation of the social system server 240 in concert with the video gap detection and recommendation module 260 and the video sentiment analysis module 300, FIG. 3 is a flow chart illustrating a process for video sentiment analysis in video messaging. Beginning in block 305, an end user selects a thread of discussion in a user interface to a social system. In block 310, the social system retrieves a list of video contributions for the selected thread of discussion and in block 315, the social system retrieves an aggregate sentiment computed for the thread of discussion. Finally, in block 320, the social system displays the aggregate sentiment in the user interface in connection with the selected thread of discussion.

In decision block 325, the social system determines if a reply to the thread of discussion has been requested by the end user. If not, the social system incurs a delay in block 330 before refreshing the display of the thread of discussion by way of block 310. Otherwise, in block 335, the social system receives as an upload a new video contribution. In block 340, the social system invokes the video sentiment analysis module to compute the sentiment of the new video contribution, including any or all of an emotion of the new video contribution, a tone of the new video contribution and a degree of jargon utilization of the new video contribution.

In block 345, the video gap detection and recommendation module compares the computed sentiment of the new video contribution to the aggregate sentiment. In decision block 350, if the video gap detection and recommendation module determines that the computed sentiment is consistent with the aggregate sentiment within a threshold value, then in block 365 the social system posts the new video contribution to the selected thread of discussion. However, if the video gap detection and recommendation module determines that the computed sentiment is not consistent with the aggregate sentiment within the threshold value, then in block 355 the video gap detection and recommendation module prompts the end user to upload a different video contribution that is either a completely new video contribution or an edited form of the new video contribution. In decision block 360, if the end user declines to do so, then in block 365 the social system posts the new video contribution to the selected thread of discussion. Otherwise, in block 335 the social system receives a different video contribution and the process continues through block 340.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows.

We claim:

1. A method for video sentiment analysis in video messaging, the method comprising:
    receiving different video contributions to a thread in a social system executing in memory of a computer;
    sensing from a plurality of the video contributions a contributor sentiment;
    computing a sentiment value for the sensed contributor sentiment of the different video contributions;
    receiving a new video contribution of a new video by an end user, sensing from the new video contribution a new contributor sentiment and computing a new sentiment value for the new contributor sentiment;
    comparing the new sentiment value to the sentiment value of the different video contributions; and,
    on the condition that a threshold disparity exists between the compared values, displaying in a user interface to the thread a prompt to upload a different video contribution with a sentiment more consistent with the sensed contributor sentiment of the different video contributions.

2. The method of claim 1, wherein the sensing is facial recognition in order to determine an emotion of a contributor of a corresponding one of the video contributions.

3. The method of claim 1, wherein the sensing is a sound analysis in order to determine a tone of a contributor of a corresponding one of the video contributions.

4. The method of claim 1, wherein the sensing is a textual parsing of content of each of the video contributions in order to determine a level of jargon of a corresponding one of the video contributions.

5. The method of claim 1,
    wherein the sensing is each of facial recognition in order to determine an emotion of a contributor of each of the video contributions, a sound analysis in order to determine a tone of a contributor of each of the video contributions, and a textual parsing of content of each of the video contributions in order to determine a level of jargon of a corresponding one of the video contributions, and
    wherein the computed sentiment for the selected one of the video contributions
is a combination of a numerical value computed for a sensed emotion for the selected one of the video contributions, a numerical value computed for a level of jargon for the selected one of the video contributions and a numerical value computed for a level of sarcasm for the selected one of the video contributions.

6. The method of claim 1, further comprising displaying in the user interface to the thread an aggregate sentiment for all of the video contributions.

7. A data processing system configured for video sentiment analysis in video messaging, the system comprising:

a computer with memory and at least one processor;
a social system executing in the memory of the computer; and,
a video sentiment analysis module comprising program code executing in the memory of the computer, the program code sensing a contributor sentiment from a plurality of several different video contributions to a thread in the social system, computing a sentiment for the different video contributions, receiving a new video contribution of a new video by an end user, sensing from the new video contribution a new contributor sentiment and computing a new sentiment value for the new contributor sentiment, comparing the new sentiment value to the sentiment value of the different video contributions and, on the condition that a threshold disparity exists between the compared values, displaying in a user interface to the thread a prompt to upload a different video contribution with a sentiment more consistent with the sensed contributor sentiment of the different video contributions.

8. The system of claim 7, wherein the sensing is facial recognition in order to determine an emotion of a contributor of a corresponding one of the video contributions.

9. The system of claim 7, wherein the sensing is a sound analysis in order to determine a tone of a contributor of a corresponding one of the video contributions.

10. The system of claim 7, wherein the sensing is a textual parsing of content of each of the video contributions in order to determine a level of jargon of a corresponding one of the video contributions.

11. The system of claim 7,
wherein the sensing is each of facial recognition in order to determine an emotion of a contributor of each of the video contributions, a sound analysis in order to determine a tone of a contributor of each of the video contributions, and a textual parsing of content of each of the video contributions in order to determine a level of jargon of a corresponding one of the video contributions, and
wherein the computed sentiment for the selected one of the video contributions
is a combination of a numerical value computed for a sensed emotion for the selected one of the video contributions, a numerical value computed for a level of jargon for the selected one of the video contributions and a numerical value computed for a level of sarcasm for the selected one of the video contributions.

12. The system of claim 7, wherein the program code further displays in the user interface to the thread an aggregate sentiment for all of the video contributions.

13. A computer program product for video sentiment analysis in video messaging, the computer program product comprising a computer readable storage medium having program instructions embodied therewith, the program instructions executable by a device to cause the device to perform a method comprising:
  receiving different video contributions to a thread in a social system executing in memory of a computer;
  sensing from a plurality of the video contributions a contributor sentiment;
  computing a sentiment for the different video contributions;
  receiving a new video contribution of a new video by an end user, sensing from the new video contribution a new contributor sentiment and computing a new sentiment value for the new contributor sentiment;
  comparing the new sentiment value to the sentiment value of the different video contributions; and,
  on the condition that a threshold disparity exists between the compared values, displaying in a user interface to the thread a prompt to upload a different video contribution with a sentiment more consistent with the sensed contributor sentiment of the different video contributions.

14. The computer program product of claim 13, wherein the sensing is facial recognition in order to determine an emotion of a contributor of a corresponding one of the video contributions.

15. The computer program product of claim 13, wherein the sensing is a sound analysis in order to determine a tone of a contributor of a corresponding one of the video contributions.

16. The computer program product of claim 13, wherein the sensing is a textual parsing of content of each of the video contributions in order to determine a level of jargon of a corresponding one of the video contributions.

17. The computer program product of claim 13,
wherein the sensing is each of facial recognition in order to determine an emotion of a contributor of each of the video contributions, a sound analysis in order to determine a tone of a contributor of each of the video contributions, and a textual parsing of content of each of the video contributions in order to determine a level of jargon of a corresponding one of the video contributions, and
wherein the computed sentiment for the selected one of the video contributions
is a combination of a numerical value computed for a sensed emotion for the selected one of the video contributions, a numerical value computed for a level of jargon for the selected one of the video contributions and a numerical value computed for a level of sarcasm for the selected one of the video contributions.

18. The computer program product of claim 13, wherein the method further includes displaying in the user interface to the thread an aggregate sentiment for all of the video contributions.

* * * * *